United States Patent [19]

Porowski

[11] Patent Number: 5,361,281
[45] Date of Patent: Nov. 1, 1994

[54] STORAGE RACK FOR SPENT NUCLEAR FUEL ASSEMBLIES

[75] Inventor: Jan S. Porowski, Pittsburgh, Pa.
[73] Assignee: AEA O'Donnell, Inc., Pittsburgh, Pa.
[21] Appl. No.: 99,323
[22] Filed: Jul. 30, 1993
[51] Int. Cl.⁵ .......................... G21C 19/00
[52] U.S. Cl. ........................ 376/272; 376/261
[58] Field of Search ........ 376/272, 260, 261; 250/507.1; 976/DIG. 276

[56] References Cited

U.S. PATENT DOCUMENTS

| | | | |
|---|---|---|---|
| 4,004,154 | 1/1977 | Bevilacqua | 250/518 |
| 4,034,227 | 7/1977 | Soot | 250/507 |
| 4,044,267 | 8/1977 | Bevilacqua | 250/518 |
| 4,143,276 | 3/1979 | Mollon | 250/507 |
| 4,177,386 | 12/1979 | Wachter et al. | 250/507 |
| 4,187,433 | 2/1980 | Zezza | 250/507 |
| 4,233,518 | 11/1980 | Auyeung et al. | 250/507 |
| 4,243,889 | 1/1981 | Weber | 250/507 |
| 4,287,426 | 9/1981 | Anthony | 250/506 |
| 4,288,699 | 9/1981 | van der Vlis et al. | 250/507 |
| 4,319,960 | 3/1982 | Larson et al. | 376/272 |
| 4,342,620 | 8/1982 | Vickrey | 376/272 |
| 4,348,352 | 9/1982 | Knecht | 376/272 |
| 4,356,062 | 10/1982 | Bosshard | 376/272 |
| 4,366,115 | 12/1982 | Schlumpf | 376/272 |
| 4,400,344 | 8/1983 | Wachter et al. | 376/272 |
| 4,630,738 | 12/1986 | Bosshard | 211/60.1 |
| 4,695,424 | 9/1987 | Flynn | 376/272 |
| 4,710,342 | 12/1987 | Helary et al. | 376/272 |
| 4,746,487 | 5/1988 | Wachter | 376/272 |
| 4,781,883 | 11/1988 | Daugherty et al. | 376/272 |
| 4,788,030 | 11/1988 | Bosshard | 376/272 |
| 4,820,472 | 4/1989 | Machado et al. | 376/272 |
| 4,857,263 | 8/1989 | Machado et al. | 376/272 |
| 4,900,505 | 2/1990 | Machado et al. | 376/272 |
| 4,948,553 | 8/1990 | Machado et al. | 376/272 |
| 4,952,072 | 8/1990 | Ellingson et al. | 376/261 |
| 4,960,560 | 10/1990 | Machado et al. | 376/272 |
| 5,196,161 | 3/1993 | Lewis | 376/272 |

FOREIGN PATENT DOCUMENTS 2730850 2/1988 Germany.

*Primary Examiner*—Donald P. Walsh
*Assistant Examiner*—Meena Chelliah
*Attorney, Agent, or Firm*—Roylance, Abrams, Berdo & Goodman

[57] ABSTRACT

A storage rack for storing spent nuclear fuel assemblies using a minimum space of a storage pool. The storage rack includes a plurality of tubular cells with a plurality of moderating members of neutron-absorbing material coupled thereto, and a base member coupled to the tubular cells for supporting the tubular cells substantially perpendicular thereto. The tubular cells are constructed of a plurality of prebent panels forming side portions of the cells. At least one of the prebent panels form at least two of the side portions of at least two of the tubular cells which are diagonally arranged relative to each other.

13 Claims, 11 Drawing Sheets

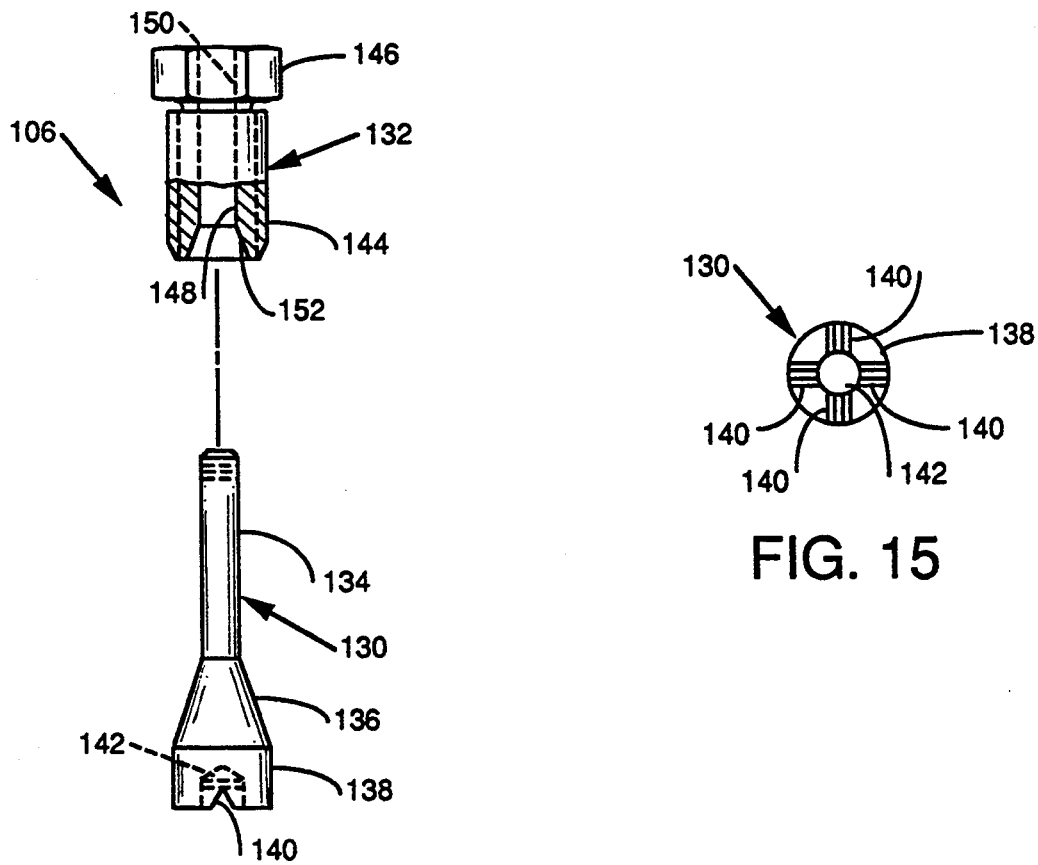
FIG. 14
FIG. 15
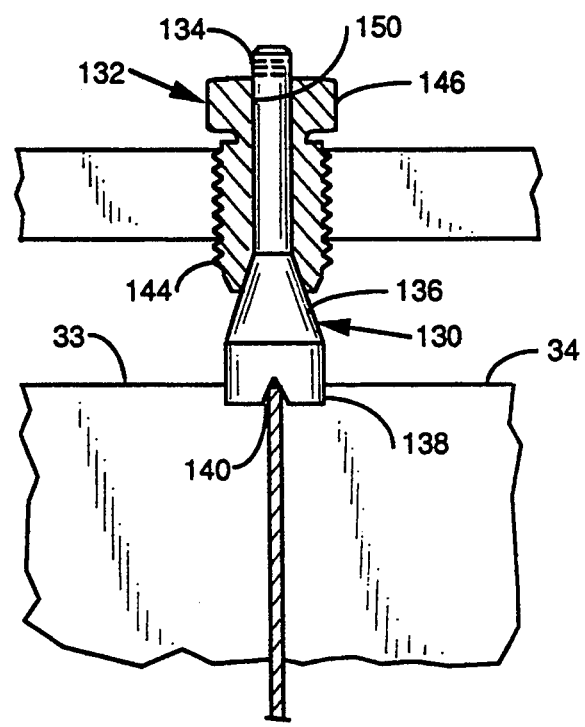
FIG. 16

STORAGE RACK FOR SPENT NUCLEAR FUEL ASSEMBLIES

FIELD OF THE INVENTION

This invention relates to storage racks for storing spent nuclear fuel assemblies. More specifically, this invention relates to an improved storage rack design to be placed in a nuclear fuel assembly storage pool containing a coolant.

BACKGROUND OF THE INVENTION

Currently, nuclear power plants produce large quantities of radioactive spent fuel. These nuclear power plants were originally constructed with a limited amount of storage space for the spent fuel, since it was originally contemplated that the spent fuel would be either reprocessed to provide fissionable uranium and plutonium or stored by the United States government at remote locations from the nuclear power plant. However, the spent fuel has not been reprocessed or removed from the nuclear power plants. Accordingly, the nuclear power plants are continuously seeking ways to better utilize the spent fuel storage space currently available at the plant in a way to permit the storage of larger quantities of fuel in the same given area. Thus, there exists a need to increase the storage capacity of the existing storage facilities.

Most current fuel assemblies are composed of a plurality of fuel rods containing nuclear fuel held in the fuel assembly. The fuel assembly typically has a square cross-section with a width ranging from about 6" to about 12" and a length of about 16 feet. The fuel assembly is used in the nuclear reactor, they are removed and stored in spent fuel storage racks. The storage racks have a plurality of vertically arranged cells designed to adequately support the fuel assemblies also during potential seismic events.

Spent fuel retains a measure of reactivity, i.e., neutron emissivity, which is appreciable but insufficient for economic use in a reactor. Accordingly, it is necessary that the spent fuel be stored in such a way that the mass stored does not become critical. In refueling a reactor, the fuel assemblies in specified areas of the reactor are replaced at intervals of several years. The residual reactivity of the removed or spent fuel assemblies throughout each area of the refueling is not uniform. It is then necessary, in the storage of spent fuel, to preclude nuclear criticality by reason of the presence of fuel assemblies having high residual reactivity.

Accordingly, prior art storage racks precluded such criticality by providing racks whose cells are appropriately spaced apart. In addition, quantities of neutron-absorbing material or poison can be provided in the cells of the racks in which the spent fuel is stored. The first of these solutions, i.e., spacing the cells apart, requires that the volume occupied by the storage racks be unreasonably large. The second solution, i.e., using poison, introduces a high cost factor.

Specifically, storage racks were originally comprised of tubes of a square cross-section with a fuel assembly placed in each of the tubes or cells. These tubes were connected together in batteries of several hundred tubes and placed in a pool of water or coolant to reduce the radiation effects. The tubes were connected to each other by welding the tubes in the upper and lower section to form square pattern of cells. The space between the tubes were used to place an additional radiation moderating material technically known as poison.

The racks with fuel assemblies in individual tubes, however, occupy significant space in the pool and their cost was high because each fuel assembly was surrounded by the tube material and therefore there were two metal walls of tubes between the neighboring two stored assemblies.

In order to place more cells in the pool as well as to reduce the cost of the racks, nuclear utilities began to replace the existing structures in the storage pools with racks of high density structure where only every second fuel assembly was placed in individual tubes. An example of such a storage rack is disclosed in U.S. Pat. No. 4,960,560 to Machado et al, of which the entire disclosure is hereby incorporated herein by reference.

By placing the tubes in a checkerboard pattern as disclosed in U.S. Pat. No. 4,960,560, it became possible to support every other fuel assembly in the space generated by the neighboring tubes. Thus, the area of the tube cells was reduced to about half, and the fuel assemblies could be placed closer to each other. The tubes of this storage were connected by weldments at one side of the tube corners and were attached to the bottom plate by fillet welding. Such asymmetric joints in such storage racks result in deterioration and reduces the accuracy of fabrication of the storage rack. Accordingly, such storage racks require larger tolerances to fabricate.

Examples of some other prior storage racks for storing spent nuclear fuel assemblies are disclosed in the following U.S. Pat. Nos.: 5,196,161 to Lewis; 5,032,348 to Blum et al; 4,948,553 to Machado et al; 4,900,505 to Machado et al; 4,857,263 to Cooney et al; 4,820,472 to Booker et al; 4,788,030 to Bosshard; 4,746,487 to Wachter; 4,710,342 to Grenon et al; 4,695,424 to Flynn; 4,630,738 to Bosshard; 4,400,344 to Robbins et al; 4,366,115 to Schlumpf; 4,319,960 to Larson et al; 4,288,699 to Boucherie et al; 4,287,426 to Anthony; 4,243,889 to Weber; 4,233,518 to Auyeung et al; 4,187,433 to Zezza; 4,177,386 to Robbins et al.; and 4,143,276 to Mollon.

In view of the above, it is apparent that there exists a need in for a storage rack for storing spent nuclear fuel assemblies which will overcome the above problems, and which utilizes less space than the prior storage racks, and which is relatively simple to manufacture and inexpensive to construct.

This invention these needs in the art along with other needs which will become apparent to those skilled in the art once given this disclosure.

SUMMARY OF THE INVENTION

Accordingly, a primary object of the present invention is to provide a storage rack for storing spent nuclear assemblies within a relatively compact area in the storage pool.

Another object of the present invention is to provide a storage rack for storing spent nuclear fuel assemblies which is relatively inexpensive and simple to manufacture.

A further object of the present invention is to provide a storage rack for storing spent fuel assemblies which can withstand seismic activities.

The foregoing objects are basically attained by providing a storage rack for storing spent nuclear fuel assemblies, comprising: a plurality of tubular cells with rectangular cross-sections for receiving spent nuclear fuel assemblies therein, each of these cells having four side portions and four corners constructed from a plurality of prebent panels coupled together, at least one of said panels being prebent so that its top profile includes at least two diagonally arranged L-shaped portions forming at least two of the side portions of at least two of the cells diagonally arranged to each other within the storage rack; coupling members for attaching the panels together to form the cells; a plurality of moderating members constructed of neutron-absorbing material being coupled to the side portions of the panels, the moderating members being arranged between the nuclear fuel assemblies to be positioned in the cells; and a base member coupled to the panels for supporting the cells substantially perpendicular to the base member.

The storage rack disclosed and claimed herein comprises cells built of prebent panels which provide additional strength between the adjacent cells and along the entire length of the cells. Welds between panels of the present invention are located at cell corners. These welds are symmetric with respect to the corner's midplane, and therefore introduce smaller deterioration then joints formed by the asymmetric fillet welds. Moreover the supports of the storage rack of the present invention of the battery of cells enables parallel motion of the cells relative to the pool wall whereas the supports of existing storage racks result in cantilever mode of distortion complicating the fluid analysis and introducing shear stress in weldments between the cells.

Other objects, advantages, and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings which form part of this original disclosure:

FIG. 14 is an enlarged, exploded view of one of the adjustable holding members used in the fixture assembly illustrated in FIGS. 2–4;

FIG. 15 is a bottom plan view of the locking pin of the holding member illustrated in FIG. 14;

FIG. 16 is an enlarged, partial elevational view of the storage rack and fixture assembly illustrating the interaction between the panels and the adjustable holding member;

DETAILED DESCRIPTION OF THE PREFERRED EMBODIMENT

Figure 1:
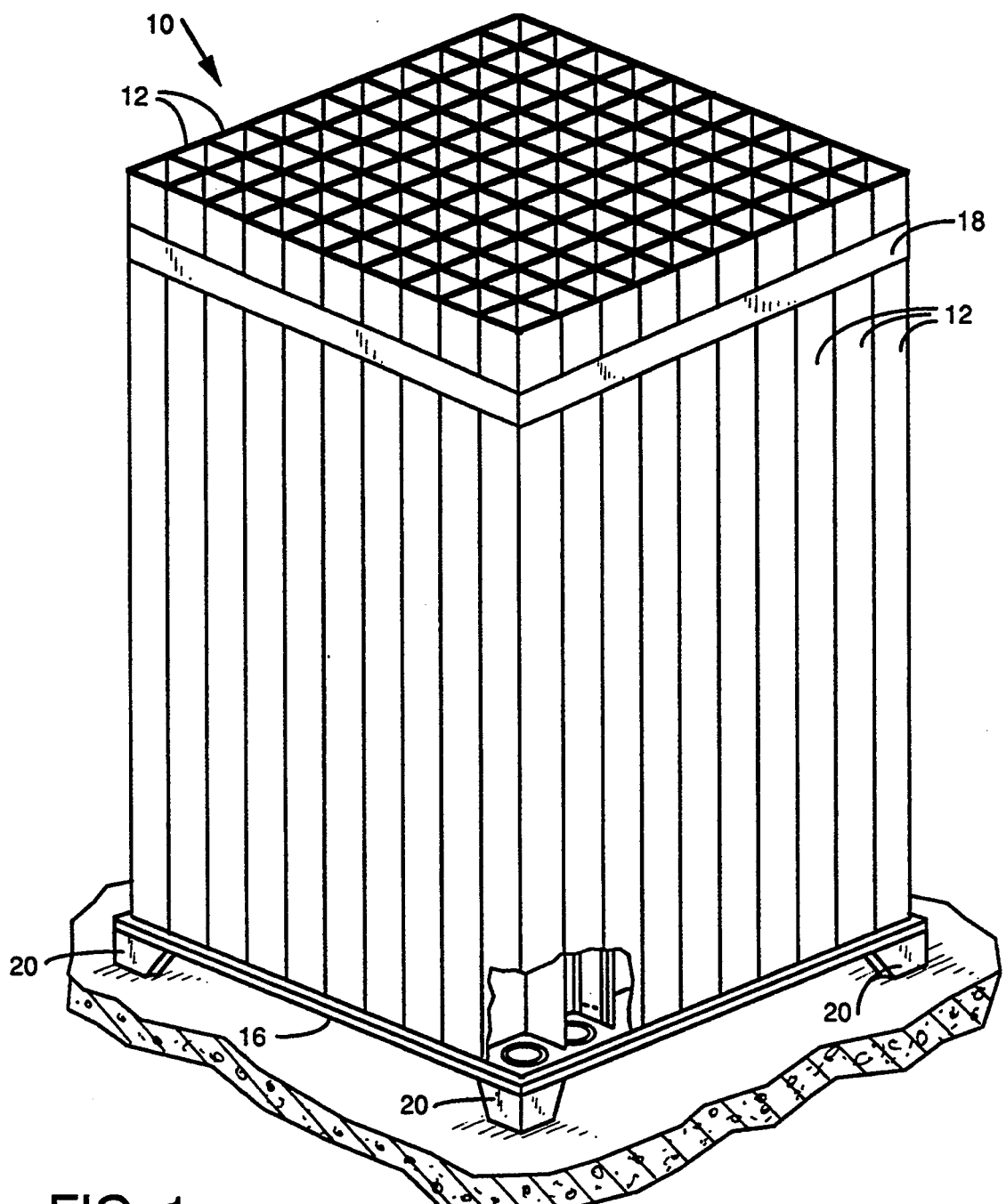
FIG. 1 is a perspective schematic view of a storage rack for storing spent fuel assemblies in accordance with the present invention with certain parts broken away.
Figure 2:
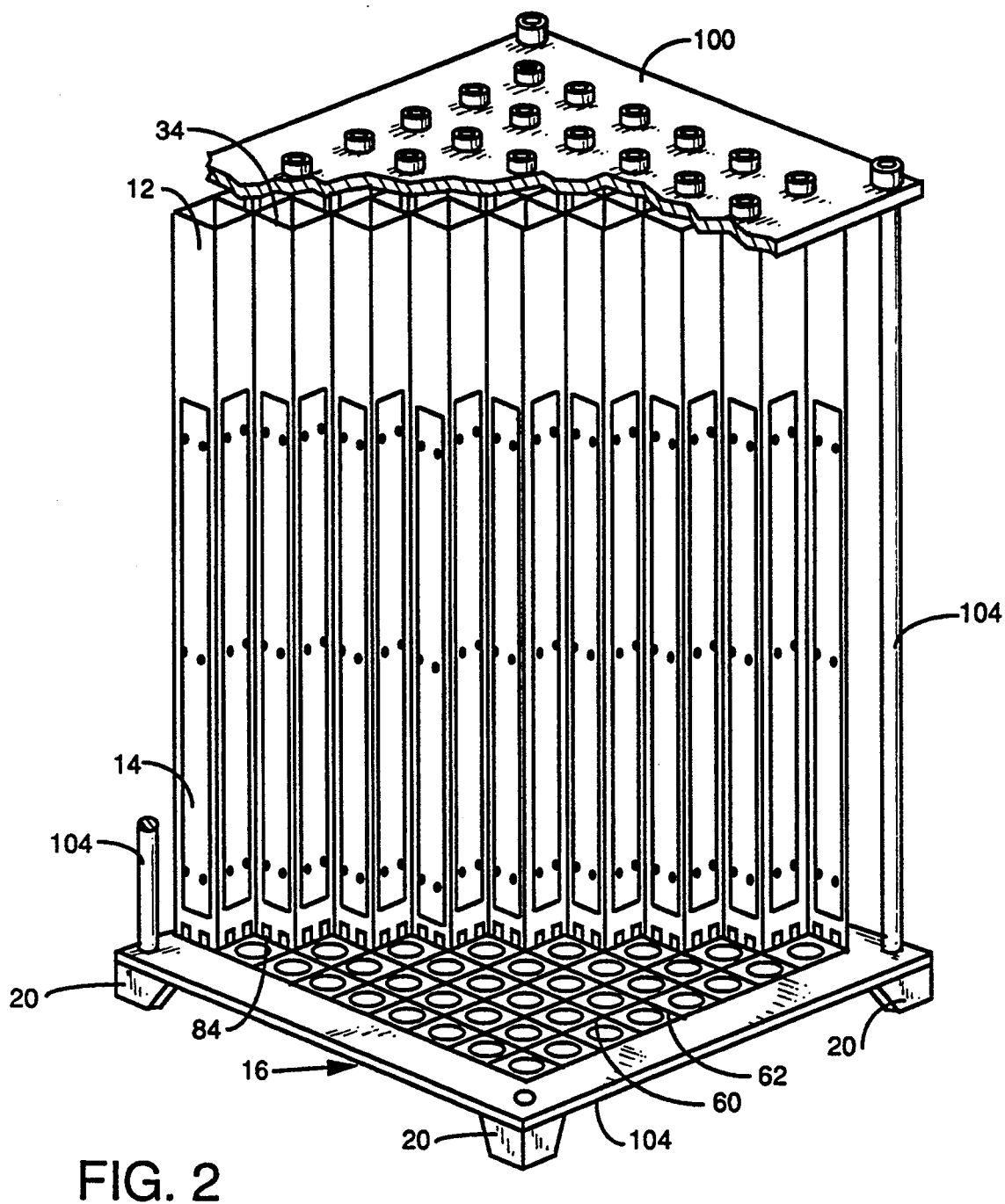
FIG. 2 is a partial perspective view of a partially assembled storage rack in accordance with the present invention being constructed using a fixture assembly in accordance with another aspect of the present invention.

Referring now to the FIGURES, a storage rack 10 in accordance with the present invention is illustrated for storing spent nuclear fuel assemblies (not shown). Storage rack 10 includes a plurality of tubular cells 12, a plurality of moderating members 14 rigidly coupled to cells 12, and a base plate or member 16 rigidly coupled to cells 12 for supporting cells 12 substantially perpendicular to base member 16. Additional stability and rigidity is imparted to storage rack 10 by a metallic banding bar 18 encircling the upper end of tubular cells 12. Storage rack 10 can also include four or more adjustable leveling pads 20 for leveling storage rack 10 within a storage pool for spent fuel assemblies.

For the purpose of clarity, storage rack 10 is being illustrated in FIGS. 2–18 as only having sixteen tubular cells 12 therein. However, it will be apparent to those skilled in the art that the storage rack 10 can be formed of any number of tubular cells 12 to accommodate the desired need of the storage pool for the nuclear power plant.

Figure 5:
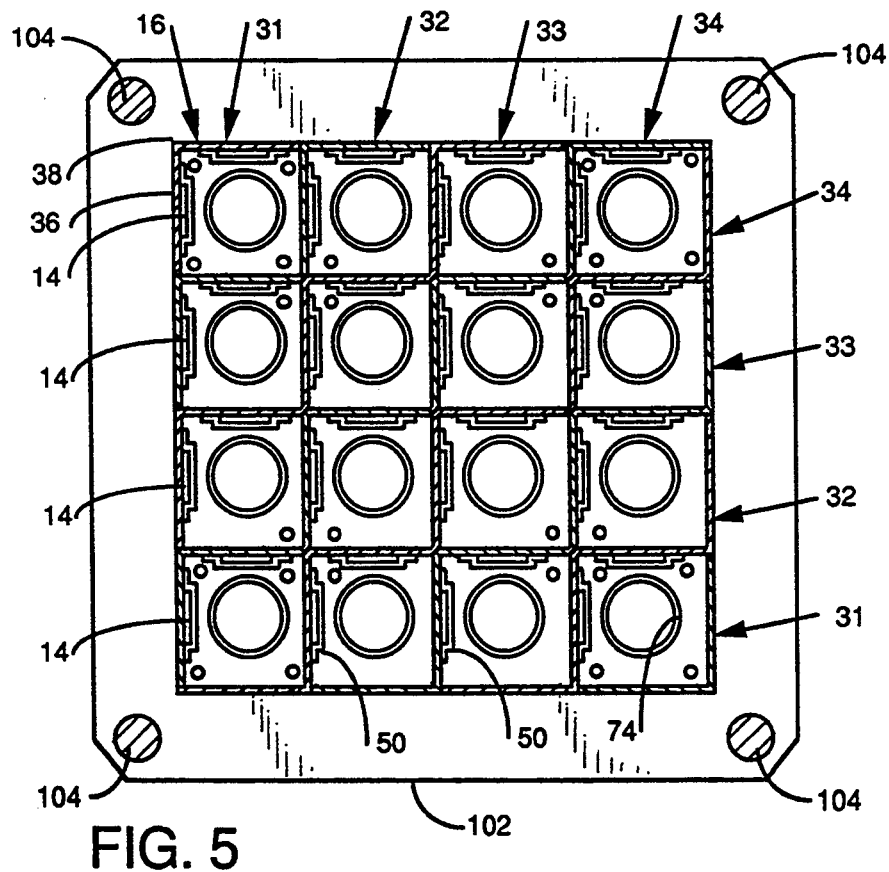
FIG. 5 is a transverse cross-sectional view of the completed storage rack illustrated in FIG. 3 taken along section line 5—5 with some of the moderating members removed for clarity.
Figure 6:
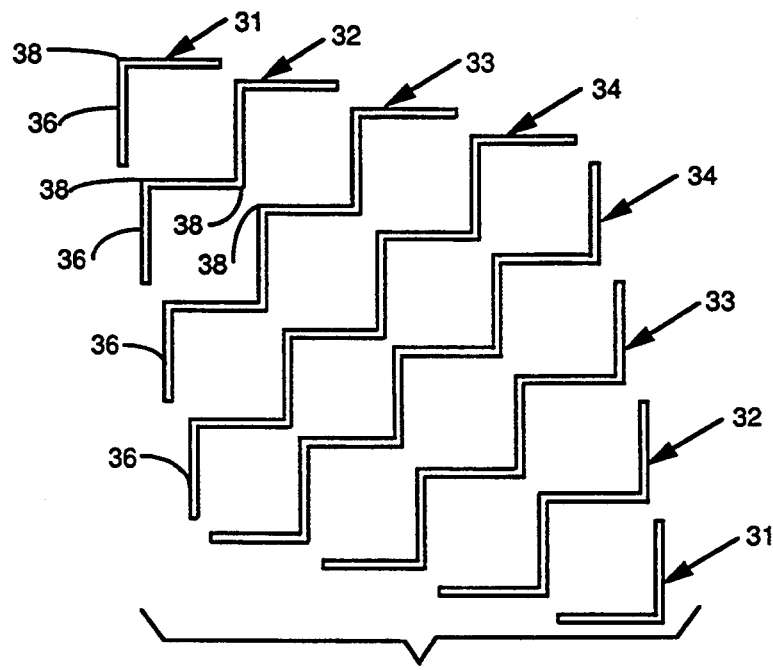
FIG. 6 is an exploded top plan view of the panels of the storage rack illustrated in FIGS. 3–5 prior to assembly.

As seen in FIGS. 5 and 6, cells 12 are formed from panels 31–34. Each of the panels 31–34 are constructed of a unitary, one-piece integral sheet of material which is then bent to form cells 12. Each of the panels 31–34 are folded or bent to form side portions 36 and corners 38 of cells 12. In particular, in manufacturing a sixteen cell storage rack 10, eight bent panels are preferably utilized, i.e., two panels 31 having an L-shaped top profile, two panels 32 having a W-shaped top profile, two panels 33 having a three crest wave shaped top profile, and two panels 34 having a double W-shaped top profile. In other words, panels 31–34 are bent so that the top profile of each of the panels 31-34 includes one or more L-shaped portions. Accordingly, panels 31-34 extend diagonally within storage rack 10. Preferably, the edges or ends 39 of panels 31-34 are staggered within storage rack 10 for additional stability. Panels 31 have two side portions 36 and one corner 38. Panels 32 have four side portions 36 and three corners 38. Panels 33 have six side portions 36 and five corners 38. Panels 34 have eight side portions 36 and seven corners 38. Preferably, panels 31-34 are constructed of 0.075" stainless steel, although different thicknesses for panels 31-34 may be used depending upon the desired design criteria for the particular application.

Figure 4:
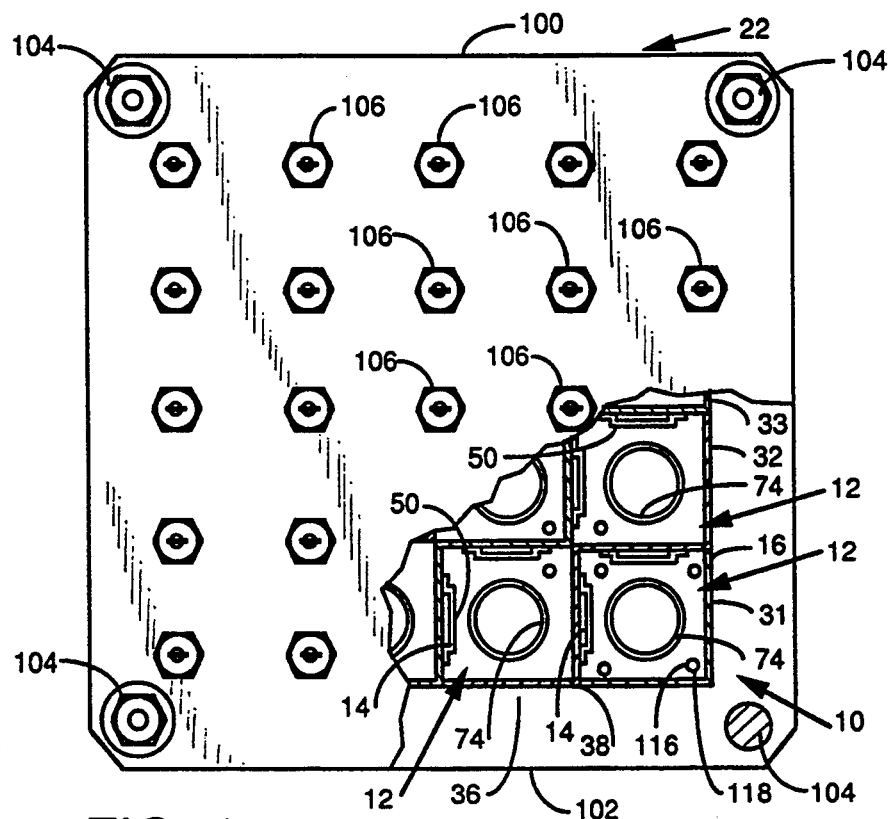
FIG. 4 is a partial top plan view of the storage rack and the fixture assembly illustrated in FIG. 3.

As seen in FIG. 4, preferably, side portions 36 of panels 31-34 are all substantially equal in width and height so that tubular cells 12 are shaped as elongated, substantially square parallelepiped with an open top end 40 and an open bottom end 42.

Figure 7:
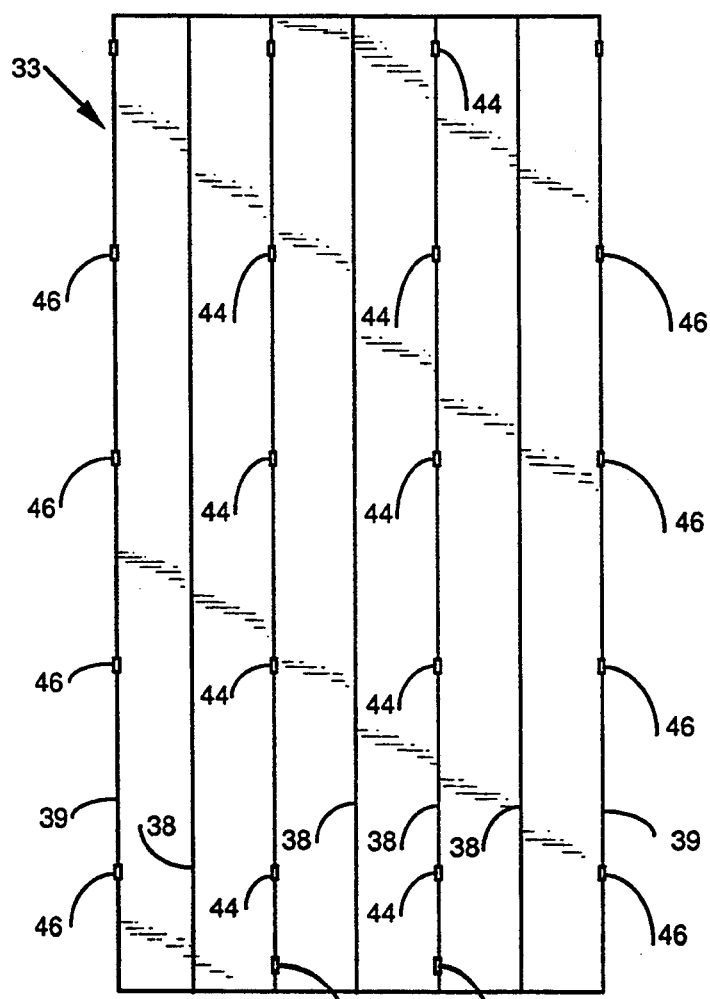
FIG. 7 is a side elevational view of one of the panels used to construct the storage rack illustrated in FIGS. 2–6.
Figure 8:
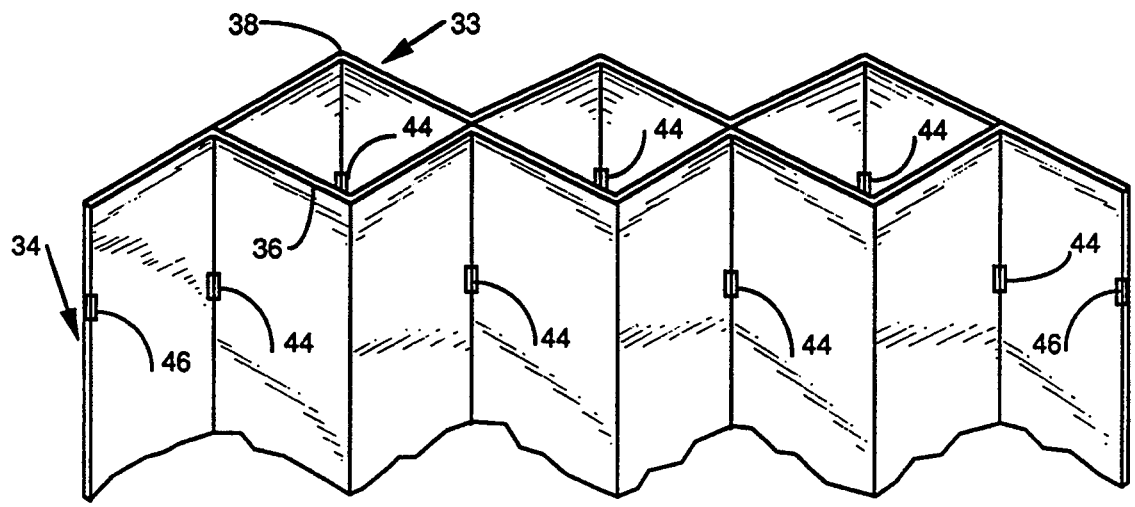
FIG. 8 is a partial perspective view of a pair of panels coupled together by fastening members or welds in constructing the storage rack illustrated in FIGS. 2–7.
Figure 9:
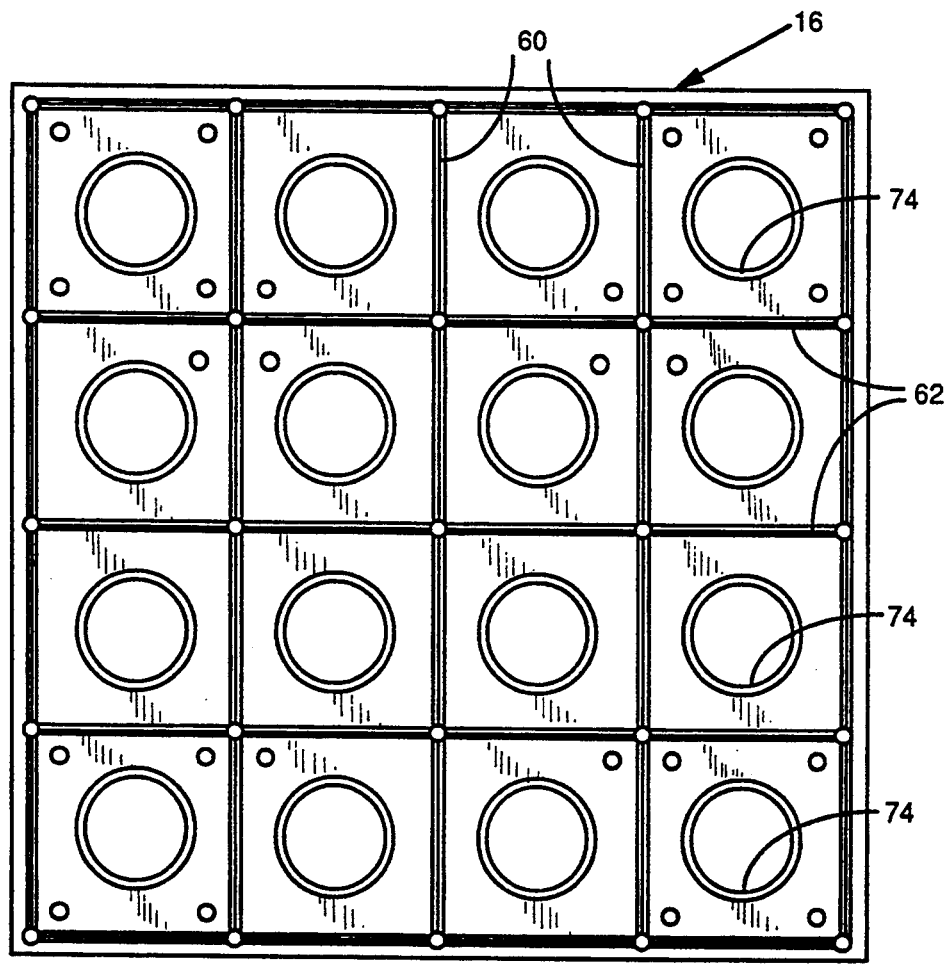
FIG. 9 is a top plan view of the base member of the storage rack illustrated in FIGS. 2–7.

As seen in FIGS. 7 and 8, every other corner 38 of panels 32-34 has a plurality of welding slots 44 spaced vertically thereon for welding adjacent panels together. Preferably, welding slots 44 are approximately a ½" long with approximately six or more welding slots 44 spaced along the length of alternating corners 38. The edges 39 of each of the panels 31-34 are provided with welding cutouts 46 for welding ends of the panels to other panels at their corners or edges as necessary.

Moderating members 14 are arranged between the nuclear fuel assemblies positioned within the cells such that moderating members 14 are positioned on all four sides of each of the spent nuclear fuel assemblies in the storage rack, except for the fuel assemblies positioned in the cells on the storage rack periphery.

Moderating members 14 are preferably constructed of a neutron absorbing material such as an elastomeric silicon polymer matrix manufactured by Brand Industrial Services, Inc. of Park Ridge, Illinois under the trademark BORAFLEX. Of course, any other suitable neutron absorbing materials may be used for moderating members 14, if desired. Moderating members 14 preferably extend approximately the full length and width of the side portions 36 of panels 31-34.

A wrapper plate 50 can be utilized to secure moderating members 14 to side portions 36 of panels 32-34. Wrapper plate 50 can be constructed of 0.035 inch stainless steel to protect moderating member 14 against physical damage. Wrapper plates 50 are preferably welded to panels 32-34. The wrapper plate 50 may terminate slightly short of the ends of each of panels 32-34 or may extend completely to the end as desired.

Figure 10:
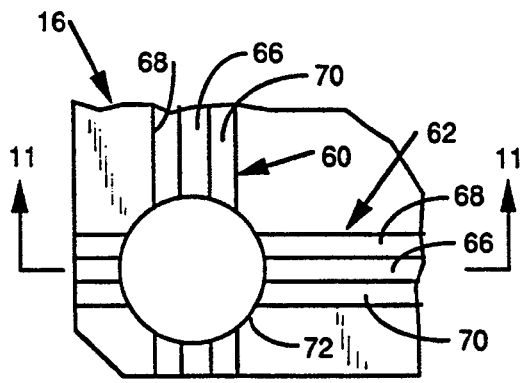
FIG. 10 is a partial, enlarged top plan view of the base member illustrated in FIG. 9.
Figure 11:
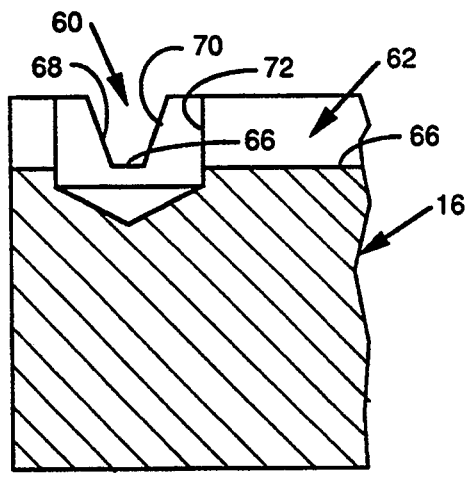
FIG. 11 is a partial cross-sectional view of the base member taken along line 11–11 of FIG. 10.

AS seen in FIGS. 10 and 11, base member 16 is preferably a one inch stainless steel plate having a substantially rectangular or square cross-section. Base member 16 has a first set of grooves 60 and a second set of grooves 62 in its upper surface for receiving the lower edges of panels 31-34 therein. Grooves 60 form a first set of parallel grooves, while grooves 62 form a second set of parallel grooves extending substantially perpendicular to the first set of grooves 60. Accordingly, grooves 60 and 62 divide base member 16 into a plurality of rectangular or square sections 64 which form the bottoms of cells 12. The grooves 60 and 62 have a generally frustoconical cross-section with a bottom surface 66 and a pair of sloping side surfaces 68 and 70. Bottom surface 66 is preferably approximately 0.85 inch in width so as to be slightly larger than the thickness of panels 31-34.

Base member 16 also includes a plurality of bore 72 extending partially into the upper surface of base member 16. Bores 72 are located at the intersection of grooves 60 and 62 for receiving corners 38 and edges 39 of panels 31-34. Accordingly, grooves 60 and 62 and bores 72 aid in the rigidity and stability of the storage rack 10.

Each of the rectangular or square sections 64 of base member 16 includes an opening 74 for receiving the bottom end 76 of a spent nuclear fuel assembly (shown schematically in broken lines). In addition to receiving and supporting the bottom end 76 of a fuel assembly, openings 74 provide a natural circulation flow path upwardly through cells 12 to ensure proper cooling of the stored fuel assembly by water or other coolant median located in the storage pool. The wall of each of the openings 74 includes an annular beveled surface 78 which is complementary to the sides of the bottom end 76 of a spent fuel assembly for supporting the fuel assembly within cell 12 of the storage rack 10.

Base member 16 also includes four sets of four threaded holes 80 which are located adjacent each of the corners of base member 16 for coupling leveling pads 20 or optional support leg assembly 24 thereto.

Figure 12:
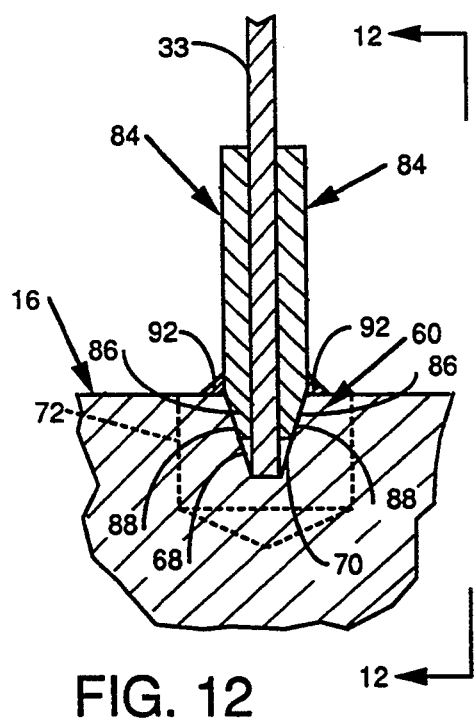
FIG. 12 is a partial cross-sectional view of the connection of one of the panels to the base member of the storage rack illustrated in FIGS. 2–7.
Figure 13:
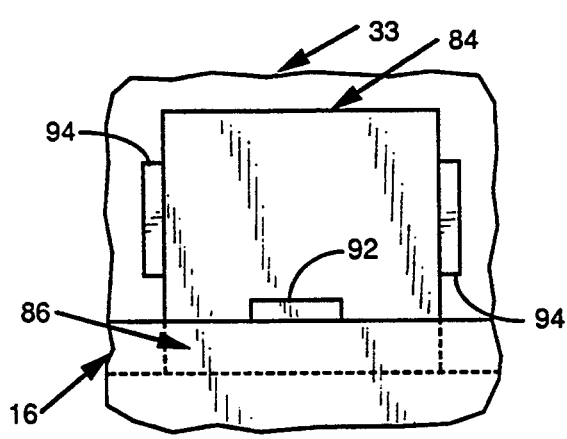
FIG. 13 is a partial, enlarged side elevational view of the connection of one of the panels to base member of the storage rack illustrated in FIGS. 2–7.

As seen in FIG. 12, panels 31-34 are preferably welded to base member 16 for rigidly securing panels 31-34 to base member 16. In particular, the lower edges of panels 31-34 are seated in grooves 60 and 62 of base member 16 so that corners 38 and edges 39 of panels 31-34 are located in bores 72. Wedges 84 are placed at various points on opposite sides of panels 31-34 and received in grooves 60 and 62 for welding panels 31-34 to base member 16 via wedges 84.

Wedges 84 are preferably constructed of stainless steel and have a tip portion 86 with a sloping surface 88 for engaging either side surface 68 or side surface 70 of grooves 60 and 62. Specifically, the wedges 84 are welded to base member 16 by welds 92, and then the panels 31-34 are welded to wedges 84 by welds 94. This arrangement helps to limit deformation of panels 31-34 during welding.

Figure 3:
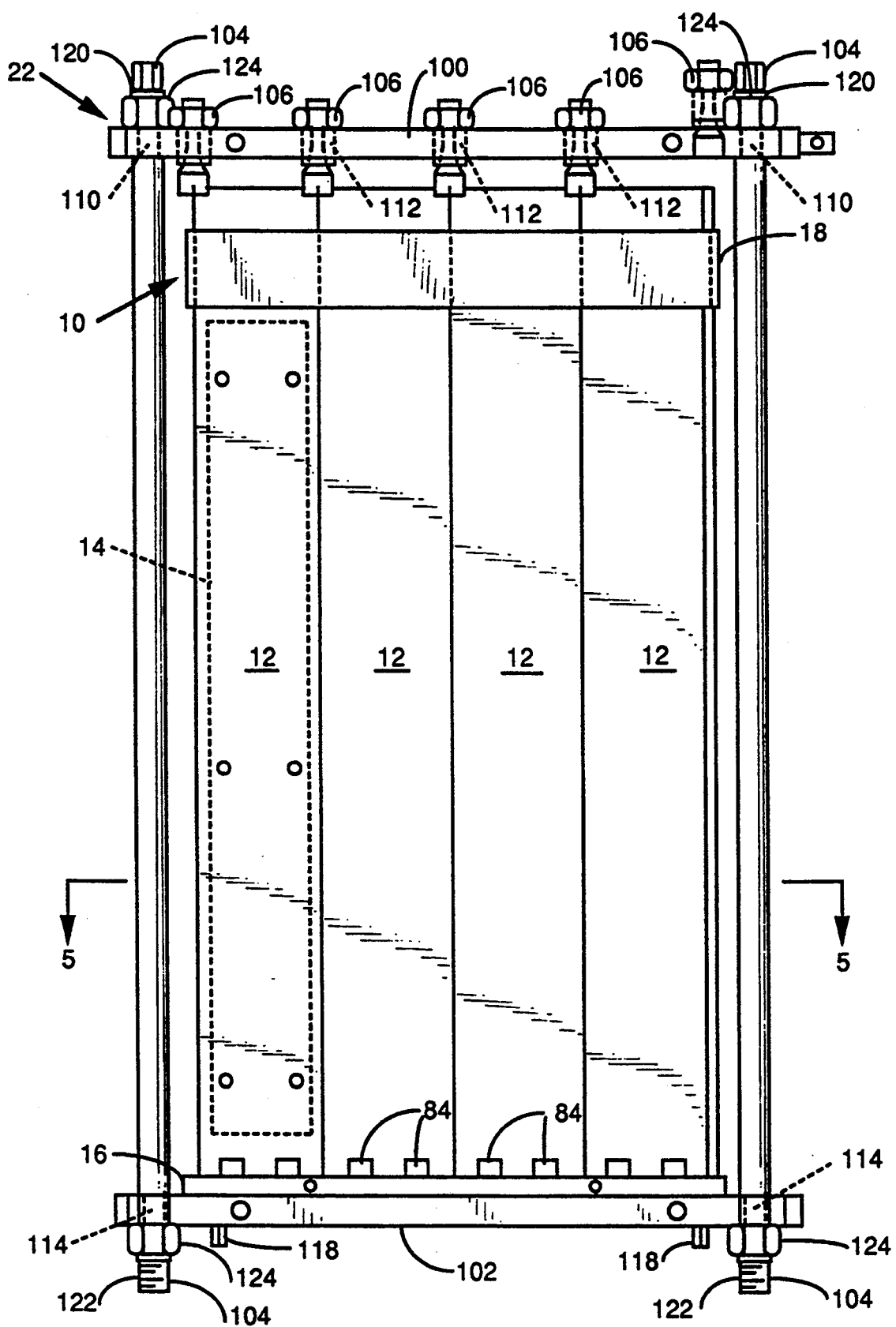
FIG. 3 is a front elevational view of a scaled down version of the storage rack illustrated in FIGS. 1 and the fixture assembly illustrated in FIG. 2.

As seen in FIGS. 3 and 4, fixture assembly 22 includes a top fixture plate 100, a bottom fixture plate 102, four tie rods 104 adjustably connecting top plate 100 to bottom plate 102, and a plurality of adjustable holding members 106 for holding the upper ends of panels 31-34 during assembly of storage rack 10.

Top fixture plate 100 basically includes four holes 110 for receiving the upper ends of tie rods 104 therethrough, and a plurality of threaded holes 112 for threadedly receiving holding members 106 therein. One of the holes 110 are located at each of the corners of top fixture plate 100, while holes 112 are equally spaced apart in a pattern for engaging corners 38 and edges 39 of panels 31-34.

Bottom plate 102 is substantially rectangular and has four holes 114 with one located at each of the corners of bottom plate 102 for receiving the lower ends of tie rods 104, and four holes 116 spaced inwardly from holes 114 for receiving a split pin 118 therein for positioning base member 16 thereon.

Tie rods 104 are substantially conventional rods and therefore will not be discussed in detail herein. Tie rods 104 preferably have upper and lower threaded ends 120 and 122 for threadedly receiving nuts 124 and 126 thereon for securing top fixture plate 100 and bottom fixture plate 102 at vertically spaced locations.

As seen in FIGS. 14–16, each of the holding members 106 includes a locking pin 130 and an adjusting nut 132 for adjustably coupling holding members 106 to top fixture plate 100.

As seen in FIGS. 14–16, locking pin 130 has a shaft portion 134, a conical portion 136 extending from shaft portion 134, and a cylindrical end portion 138 with four grooves 140 and a bore 142 extending from conical portion 136. Grooves 140 are designed for receiving the upper edges of panels 31–34 therein, and preferably have a substantially similar shape to grooves 60 and 62 discussed above. Bore 142 is designed to receive the corners 38 and edges 39 of panels 31–34.

Adjusting nut 132 has a threaded shaft portion 144 for threadedly engaging one of the threaded holes 112 of top fixture plate 100, a hexagon nut portion 146 for rotating adjusting nut 132 and a throughbore 148 extending axially through adjusting nut 132 for receiving shaft 134 and conical section 136 of locking pin 130 therein. In particular, throughbore 148 has a cylindrical portion 150 and a conical portion 152 for engaging shaft 134 and conical section 136 of locking pin 130, respectively.

Figure 17:
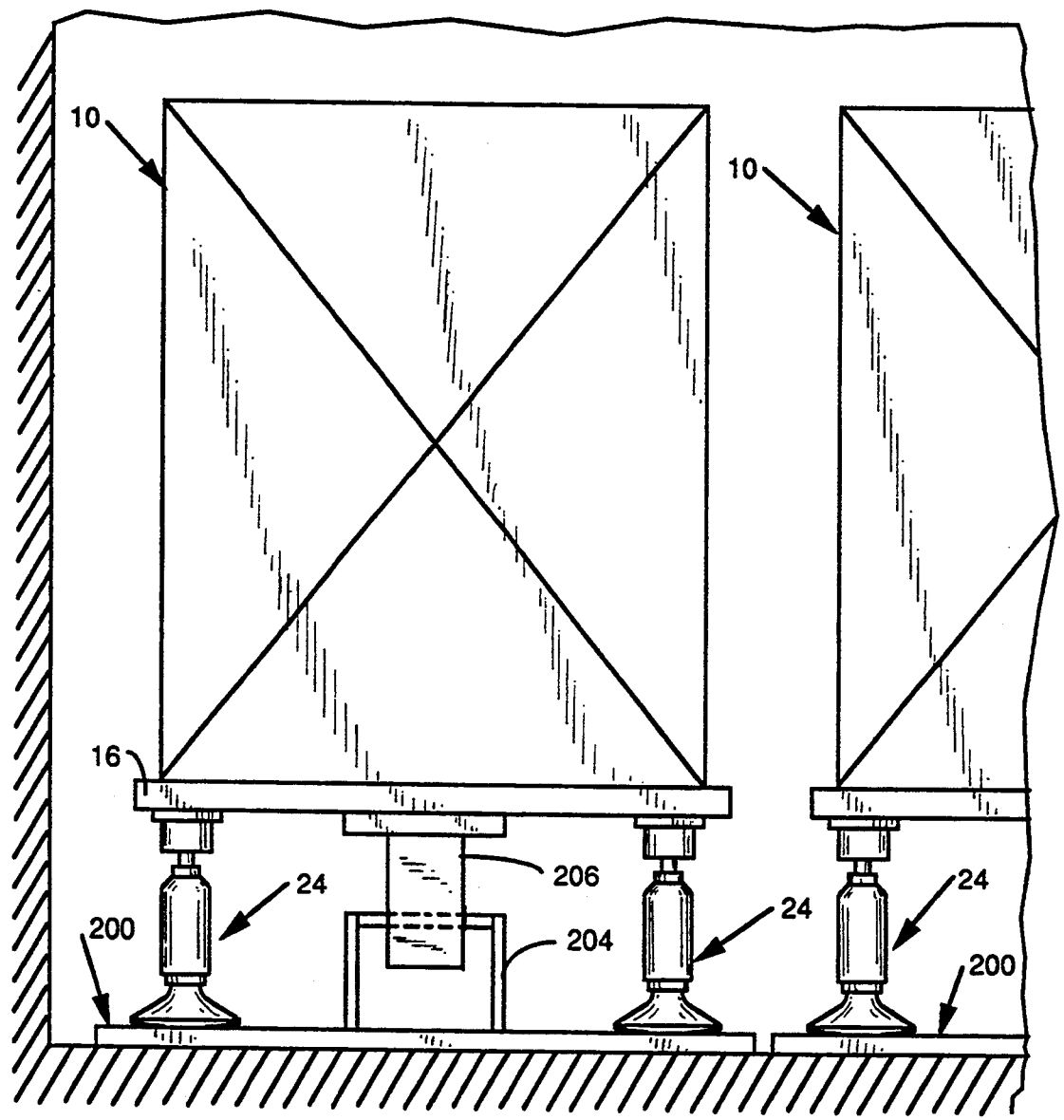
FIG. 17 is a partial schematic view of a pair of storage racks positioned in a storage pool using optional support leg assemblies in accordance with another aspect of the present invention.
Figure 18:
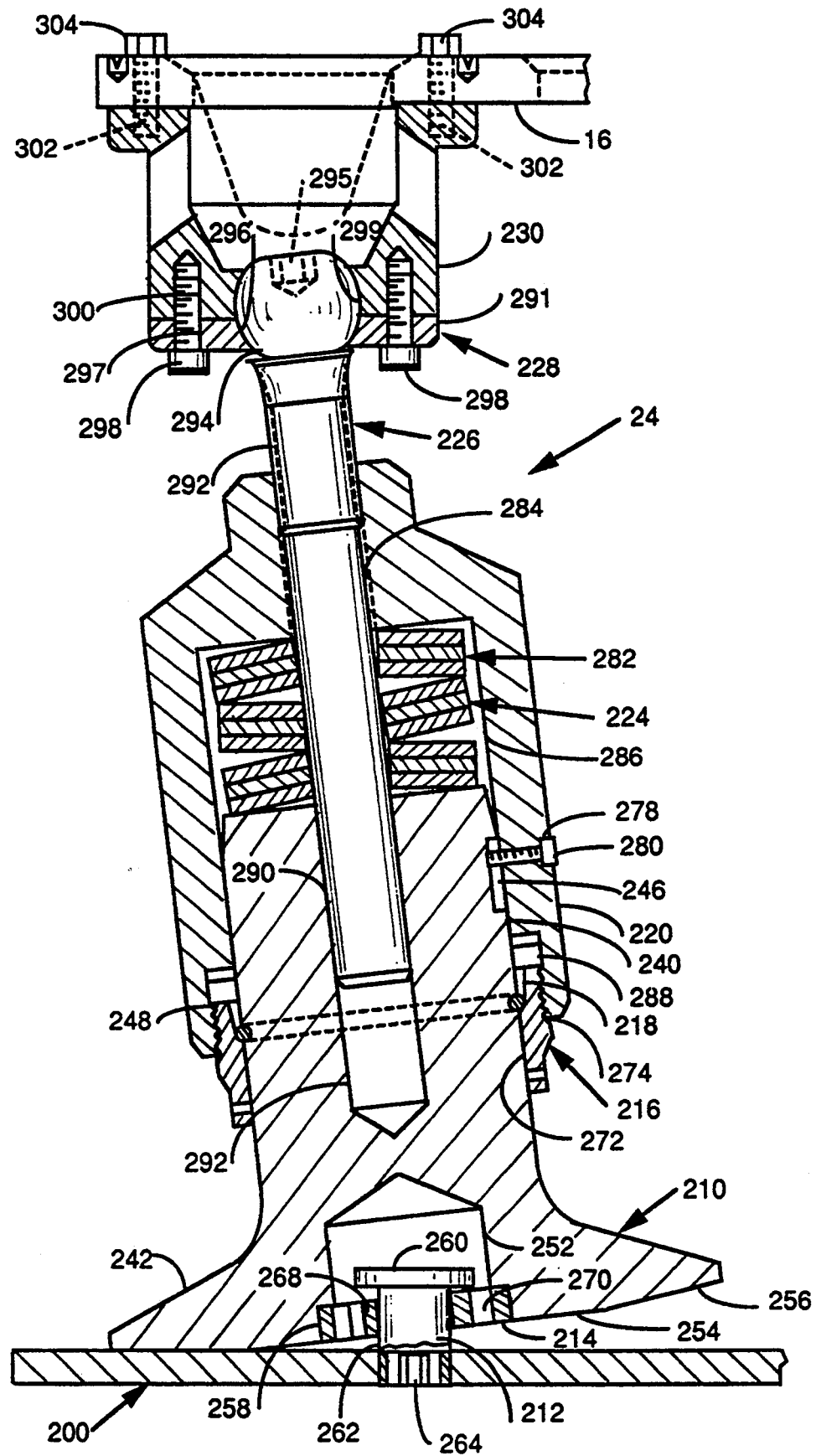
FIG. 18 is a longitudinal cross-sectional view of one of the support leg assemblies shown in FIG. 17 after being tilted in accordance with the present invention and being used with the storage rack illustrated in FIG. 1 as well as with other storage racks.
Figure 19:
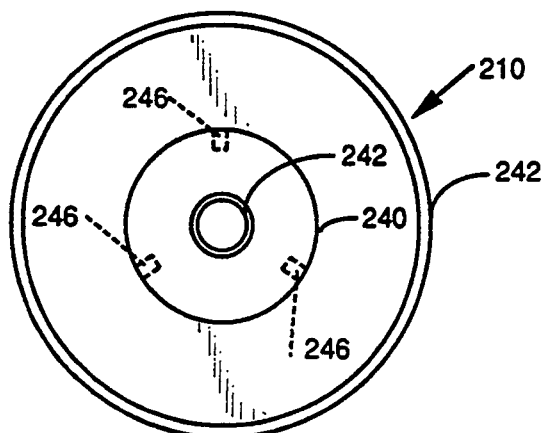
FIG. 19 is a top plan view of the foot member of the support leg assembly illustrated in FIG. 17.
Figure 20:
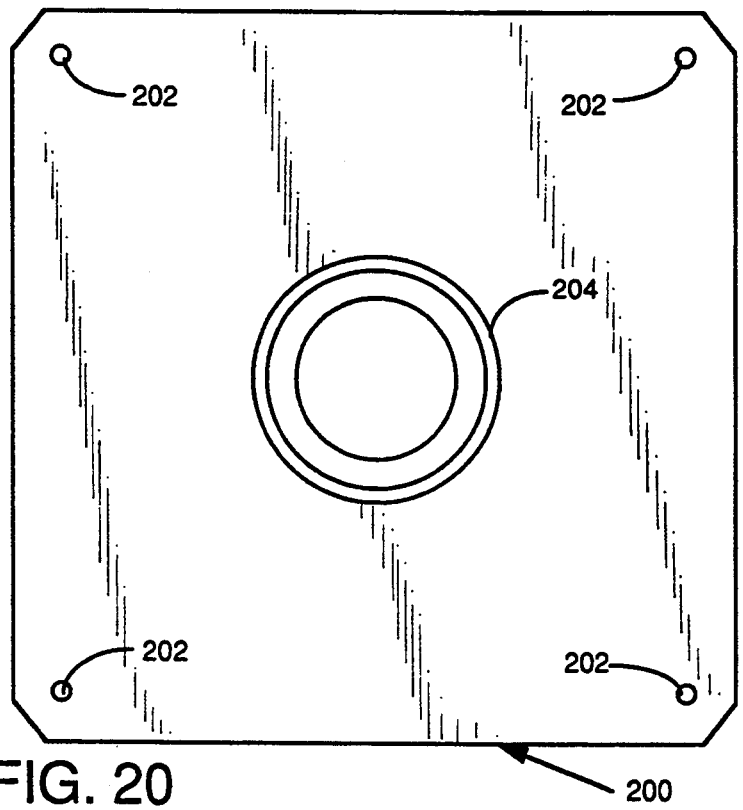
FIG. 20 is a top plan view of the foot plate used in connection with the storage rack and the support leg assemblies illustrated in FIG. 17.
Figure 21:
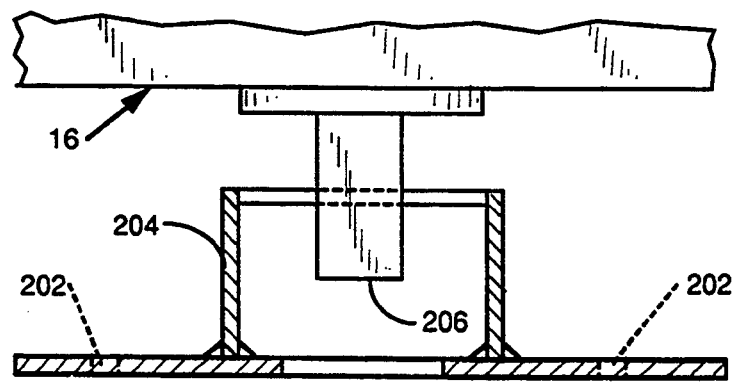
FIG. 21 is a transverse cross-sectional view of the foot plate illustrated in FIG. 20.

Referring now to FIGS. 17–21, support leg assembly 24 is an optional support leg assembly which can be used with storage rack 10 as described herein, or with any conventional storage rack for storing spent nuclear fuel assemblies. In particular, support leg assemblies 24 replace leveling pads 20, and is especially designed for handling seismic vibrations. As seen in FIGS. 17, 20 and 21, the lower ends of support leg assemblies 24 are coupled to a foot plate 200 which has four threaded holes 202 for coupling four support leg assemblies 24 thereto, while the upper ends of supporting assemblies 24 are coupled to base member 16.

Referring to FIGS. 20 and 21, foot plate 200 also includes a centrally located, upwardly extending tube 204 which engages a rod 206 extending downwardly from the center of base member 16. Rod 206 is received in tube 204 of foot plate 200 so as to prevent storage rack 10 from tipping over during seismic activities. In particular, if storage rack 10 begins to tilt on support leg assemblies 24, then rod 206 will engage the inner surface of tube 204 after approximately two inches of lateral movement of storage rack 10 to prevent further lateral movement and tipping of the storage rack 10.

As seen in FIG. 18, support leg assembly 24 includes a foot member 210 for tiltably supporting storage rack 10, a connector pin 212 for connecting foot member 210 to foot plate 200, a threaded ring 214 for securing connector pin 200 to foot member 210, a snap ring adaptor 216 coupled to foot member 210, a snap ring 218 secured to foot member 210, a foot housing 220 secured to foot member 210 via snap ring adaptor 216 and three screws 222, a plurality of Belleville washers or springs 224 positioned between foot member 210 and foot housing 220, a swivel shaft 226 adjustably coupled to foot housing 220, a swivel plate 228, and a swivel adaptor 230 for coupling support leg assembly 24 to base member 16 of storage rack 10.

As seen in FIGS. 18 and 19, foot member 210 includes a cylindrical upper portion 240 and a lower circular base portion 242. Cylindrical portion 240 includes an axially extending bore 244 for slidably receiving the lower portion of swivel shaft 226 therein. Cylindrical portion 240 also has three vertically extending slots 246 spaced equally apart around the periphery of cylindrical portion 240 for limiting relative movement between foot member 210 and foot housing 220 as discussed below, and an annular groove 248 for receiving snap ring 218 therein.

The lower surface of base portion 242 includes a centrally located cylindrical opening 252 for tiltably receiving a headed portion of connector pin 212 therein, a circular flat portion 254 concentrically arranged about opening 252, and an upwardly curved portion or spherical surface 256 concentrically arranged around flat surface 254. Accordingly, base portion 242 of foot member 210 acts as a rocking unit to allow support leg assembly 24 to rock in any lateral direction, i.e., 360° of tiltably movement.

During normal use of storage rack 10 with support leg assemblies 24 coupled thereto, storage rack 10 is substantially stationary with foot plate 200 sitting on the bottom of the storage pool and flat portion 254 engaging the top surface of foot plate 200. However, if seismic vibrations occur, then support leg assemblies 24 permit rocking or controlled tilting of storage rack 10. Namely, the seismic vibration may cause the storage rack 10 to tilt off flat portions 254 of foot member 210 and onto curved portion 256. Thus, storage rack 10 can tilt with minimal shear stress occurring on the welds of cells 12. After the seismic vibrations cease, the "rocker effect" of foot member 210 cause storage rack 10 to tilt back to its original, stationary position.

Opening 252 has internal threads 258 along a portion of its cylindrical surface for threadedly receiving threaded ring 214 therein.

Connector pin 212 has an annular flange 260 at one end and a shaft 262 with external threads at the other end for threadedly securing connector pin 212 in one of the threaded holes 202 of foot plate 200. Connector pin 212 is provided with a hexagonal bore 264 at its lower end for receiving an allen wrench for rotating and threading connector pin 212 into threaded hole 202 of foot plate 200.

Connector ring 214 has external threads 266 along its outer cylindrical surface and a centrally located bore 268 for receiving shaft 262 of connector pin 212 therein. Bore 268 of threaded ring 214 has a diameter smaller than the diameter of annular flange 260 of connector pin 212 for securing pin 212 to foot 210. However, the diameter of bore 268 is large enough to permit foot member 210 to rock on connector pin 214, as seen in FIG. 18. Threaded ring 214 is provided with four equally spaced apart bores 270 for installing threaded ring 214 into opening 252 of foot member 210.

Snap ring adaptor 216 is a generally cylindrical member having a centrally located bore 272 for receiving cylindrical portion 240 of foot member 210 therethrough, and external threaded portion 274 for threadedly and adjustably coupling snap ring adaptor 216 to foot housing 220. Bore 272 has an annular recessed portion 276 for receiving and engaging snap ring 218. Accordingly, snap ring adaptor 216 is retained on cylindrical portion 240 of foot member 210 by snap ring 218.

Snap ring 218 is adapted to be received in annular groove 248 of foot member 210. Snap ring 218 is a conventional snap ring, and thus will not be discussed or illustrated herein.

Foot housing 220 is substantially cylindrical and has an outer surface with three threaded holes 278 for receiving screws 280 for fastening foot housing 220 to foot 210. In particular, screws 280 are threaded into holes 278 so that the tip of screws 280 are received in vertically extending slots 246 of foot member 210 to limit axial movement of foot housing 220 relative to foot member 210. Foot housing 220 also has a centrally located through bore 282 having a first cylindrical portion 284 with internal threads for threadedly receiving swivel shaft 226, an enlarged second cylindrical portion 286 for receiving bevel washers 224 and the upper end of cylindrical portion 240, and a third cylindrical portion 288 having internal threads for threadedly receiving snap ring adaptor 216.

Belleville washers or springs 224 are conventional Belleville washers or springs, and thus will not be described or illustrated in detail herein.

Swivel shaft 226 includes a first shaft portion 290 adapted to be received in bore 242 of cylindrical portion 240 of foot member 210, a second shaft portion 292 with external threads for threadedly coupling swivel shaft 226 to foot housing 220 via threaded bore 284, and a spherical portion 294 extending from second shaft portion 292 for pivotally coupling swivel shaft 226 to base member 16 via swivel plate 228 and swivel adaptor 230. Spherical portion 294 is provided with an hexagonal bore 295 for rotating swivel shaft 226.

Swivel plate 228 has a central annular spherical surface 296 for supporting spherical portion 294 of swivel shaft 226, and four bores 297 for receiving screws 298 for coupling swivel plate 228 to swivel adaptor 230. Swivel adaptor 230 has a complementary annular spherical surface 299 for engaging a portion of spherical portion 294 of swivel shaft 226. Swivel adaptor 230 also includes four threaded bores 300 for threadedly receiving screws 298 therein for securing swivel plate 228 to swivel adaptor 230. Also, swivel adaptor 230 is provided with four additional bores 302 for coupling swivel adaptor 230 to base member 16 via screws 304.

CONSTRUCTION OF STORAGE RACK 10

To construct a storage rack 10, first, fixture assembly 22 is assembled by securing tie rods 104 to top fixture plate 100 and bottom fixture plate 102. Then, base member 16 is secured to bottom fixture plate 102 by four pins 118. Next, panel 34 is inserted into grooves 60 and 62 of base member 16. Panel 34 is rigidly coupled to base member 16 by inserting wedges 84 into grooves 60 and 62, and then welding wedges 84 to base member 16 and panel 34.

Second panel 33 is held adjacent to panel 34 by holding members 106 which ensures proper orientation of second panel 33 relative to first panel 34. Panel 33 is rigidly coupled to base member 16 by inserting wedges 84 into grooves 60 and 62, and then wedges 84 are welded to base member 14 and panel 33. Panel 33 is then welded to panel 34 by welding the corners 38 of panel 33 to the corners of panel 34 via welding slots 44 and welding cutouts 46. In particular, a weld is made at the lower end of slot 44 or cutout 46 for securing panel 33 to panel 34 and then the welder can check to make sure panel 33 is adequately secured to panel 34 before the remaining portion of slot 44 or cutout 46 is filled in with welding material.

Next, a third panel 32 is inserted into grooves 60 and 62 of base member 16 for securing third panel 32 to base member 16. Holding members 106 are then screwed down to properly orient panel 32 relative to panel 33 and to ensure that panel 32 is properly seated in grooves 60 and 62. Then, panel 32 is rigidly coupled to base member 16 by inserting wedges 84 into grooves 60 and 62, and then welding edges 84 to base member 14 and panel 32. Panel 32 is then welded to panel 33 by welding the corners 38 and edges 39 of panel 32 to the corners of panel 33 via welding slots 44 and cutouts 46. In particular, a weld is made at the lower end of slot 44 or cutouts 46 for securing panel 32 to panel 33 and then the welder can check to make sure panel 32 is adequately secured to panel 33 before the remaining portion of slot 44 or cutout 46 is filled in with welding material.

Now, a fourth panel 31 is held adjacent to panel 32 by holding members 106 which ensures proper orientation of second panel 31 relative to first panel 32. Panel 31 is rigidly coupled to base member 16 by inserting wedges 84 into grooves 60 and 62, and then wedges 84 re welded to base member 14 and panel 31. Panel 31 is then welded to panel 32 by welding the corners 38 and edges 39 of panel 31 to the corners of panel 32 via welding slots 44 and welding cutouts 46. In particular, a weld is made at the lower end of slot 44 or cutout 46 for securing panel 31 to panel 32 and then the welder can check to make sure panel 3 is adequately secured to panel 3 before the remaining portion of slot 44 or cutout 46 is filled in with welding material.

Now this procedure is repeated for installing another set of panels 31–34 to complete the cells. Banding bar 18 is then coupled around the upper end of the cells 12, and support leg assemblies are attached to base member 16 to complete the storage rack 10.

While only one embodiment has been chosen to illustrate the invention, it will be apparent to those skilled in the art that various modifications and changes can be made herein without departing from the scope of the invention as defined in the appended claims.

What is claimed is:

1. A storage rack for storing spent nuclear fuel assemblies, comprising:
 a plurality of vertical tubular cells with rectangular cross-sections for receiving spent nuclear fuel assemblies therein, each of said cells having four side portions and four corners constructed from a plurality of vertically extending prebent panels coupled together, at least one of said panels being prebent about three vertically extending axes so that its top profile includes at least two diagonally arranged L-shaped portions forming at least two of said side portions of at least two of said cells diagonally arranged relative to each other within said storage rack;
 a coupling member for attaching said panels together to form said cells;
 a plurality of moderating members constructed of neutron-absorbing material being coupled to at least some of said side portions of said cells, said moderating members being arranged between the nuclear fuel assemblies to be positioned in said cells; and
 a base member rigidly coupled to said panels for supporting said cells substantially perpendicular to said base member.

2. A storage rack according to claim 1, wherein said cells are arranged in a substantially square pattern.

3. A storage rack according to claim 1, wherein substantially all of said panels has a top profile which includes at least two L-shaped portions.

4. A storage rack according to claim 3, wherein each of said panels having a pair of vertically extending edges rigidly coupled to an adjacent one of said panels, said edges of said panels being staggered relative to adjacent said panels.

5. A storage rack according to claim 1, wherein said base member has an upper surface with first set of parallel grooves and a second set of parallel grooves perpendicular to said first set of grooves for receiving portions of said panels in said first and second sets of grooves.

6. A storage rack according to claim 5, wherein said panels are coupled to said base member by a plurality of connecting members being welded to said panels and said base member.

7. A storage rack according to claim 6, wherein said connecting members are wedges with tip portions that are received in said first and second sets of grooves.

8. A storage rack according to claim 1, wherein said panels extend substantially diagonally relative to each other.

9. A storage rack according to claim 8, wherein said corners of adjacent cells are welded together.

10. A storage rack according to claim 1, wherein said base member is tiltably mounted on a support assembly.

11. A storage rack according to claim 10, wherein said support assembly includes a plurality of leg assemblies with each of said leg assemblies having a lower surface with a central flat portion and a spherical portion surrounding said central flat portion.

12. A storage rack according to claim 11, wherein said leg assemblies are tiltably coupled to a foot plate.

13. A storage rack according to claim 12, wherein said support assembly includes limiting means for limiting tilting of said storage rack.

* * * * *